United States Patent [19]

Farwell

[11] Patent Number: 5,305,775
[45] Date of Patent: Apr. 26, 1994

[54] APPARATUS AND METHOD FOR PREVENTING FRAGMENTATION OF A RUPTURE DISK

[75] Inventor: Stephen P. Farwell, Owasso, Okla.

[73] Assignee: BS&B Safety Systems, Inc., Tulsa, Okla.

[21] Appl. No.: 131,907

[22] Filed: Oct. 5, 1993

[51] Int. Cl.⁵ .................... F16K 17/16; F16K 17/40
[52] U.S. Cl. ........................... 137/14; 137/68.1; 220/89.2
[58] Field of Search ........... 137/14, 68.1; 220/89.1, 220/89.2, 89.3

[56] References Cited

U.S. PATENT DOCUMENTS

| | | | |
|---|---|---|---|
| 2,095,828 | 10/1937 | Nerad | 220/89 A |
| 2,336,490 | 12/1943 | Vico | 220/89 A |
| 2,716,506 | 8/1955 | Fike | 220/89.2 |
| 3,294,277 | 12/1966 | Wood | 220/89 A |
| 3,484,817 | 12/1969 | Wood | 220/89 A |
| 3,921,556 | 11/1975 | Wood et al. | 113/120 R |
| 4,072,160 | 2/1978 | Hansen | 137/184 |
| 4,073,402 | 2/1978 | Wood | 220/89 A |
| 4,079,854 | 3/1978 | Shaw et al. | 220/89 A |
| 4,158,422 | 6/1979 | Witten et al. | 220/89 A |
| 4,211,334 | 7/1980 | Witten et al. | 220/89 A |
| 4,236,648 | 12/1980 | Wood et al. | 220/89 A |
| 4,404,982 | 9/1983 | Ou | 137/68 R |
| 4,512,171 | 4/1985 | Mozley | 220/89.2 X |
| 4,597,505 | 7/1986 | Mozley et al. | 137/68.1 X |
| 4,669,626 | 6/1987 | Mozley | 137/68.1 X |
| 4,759,460 | 7/1988 | Mozley | 137/68.1 X |
| 4,795,051 | 1/1989 | Ou | 220/89 A |
| 4,819,823 | 4/1989 | Kadakia et al. | 220/89 A |
| 5,005,722 | 4/1991 | Short, III et al. | 220/89.1 |
| 5,082,133 | 1/1992 | Farwell et al. | 220/89.2 |
| 5,167,337 | 12/1992 | Short, III et al. | 137/68.1 X |

Primary Examiner—John Rivell
Attorney, Agent, or Firm—Dougherty, Hessin, Beavers & Gilbert

[57] ABSTRACT

Apparatus for preventing fragmentation of a rupture disk during pressure relieving rupture and fluid flow through the ruptured disk includes a rupture control assembly for rupturing the disk into a petal having a body and a base for retaining the petal to the rupture disk; protrusions extending from opposite sides of a housing adjacent the rupture disk for retarding motion of generally opposed edges of the petal as the petal is forced away from the ruptured disk and thereby bending the body of the petal into a channel shape; and a protuberance in general alignment with and spaced away from the base of the petal for impacting the channel-shaped body of the petal as the petal is forced away from the rupture disk and converting the kinetic energy of the petal into deformation of the channel-shaped body in order to prevent severance of the base of the petal from the rupture disk.

17 Claims, 5 Drawing Sheets

APPARATUS AND METHOD FOR PREVENTING FRAGMENTATION OF A RUPTURE DISK

BACKGROUND OF THE INVENTION

This invention relates to rupture disk assemblies and, more particularly, but not by way of limitation, to apparatus and method for preventing fragmentation of a rupture disk during rupture of the rupture disk.

A large variety of safety pressure relieving devices of the rupture disk type have been developed and used. Generally, these devices include a rupture disk supported between a pair of complementary supporting members or flanges which are connected to a relief connection in a vessel or system containing fluid pressure. When the fluid pressure within the vessel or system exceeds the design rupture pressure of the disk, the disk ruptures causing fluid pressure to be relieved from the vessel or system through the ruptured disk.

The rupture disks which have been previously used have taken various forms and have included one or more parts. For example, flat rupture disks, rupture disks including domed or concave-convex central portions, and composites of such disks and other components such as vacuum supports, modular support assemblies, cutting members, etc. have all been used. Rupture disks with concave-convex central portions in which the concave side of the disks are exposed to fluids under pressure are commonly known as "conventional" rupture disks. Conventional rupture disks are placed in tension by the force of the fluids under pressure exerted thereon and rupture occurs when the tensile strength of the disk material is exceeded. Rupture disks including concave-convex central portions in which the convex side of the disk is exposed to fluid pressure are known as "reverse buckling" disks. Reverse buckling disks are placed in compression by the fluid pressure and, typically, the concave-convex portion first reverses itself and then ruptures when an overpressure condition occurs.

Knife blades have been utilized with reverse buckling rupture disks to puncture the disks upon reversal and bring about the full opening thereof. Scores or grooves have been utilized in both conventional and reverse buckling rupture disks to create lines of weakness along which the disk ruptures when overpressured.

While the various prior rupture disk assemblies have been successfully used in a large number of applications, problems are still encountered. One such problem is fragmentation of the rupture disk, i.e., pieces of the rupture disk fragment or sever from the assembly and may contaminate and/or damage the processes and/or equipment into which the fragments are carried. U.S. Pat. No. 5,005,722, which is assigned to the assignee of the present invention and which is incorporated herein by reference for purposes of disclosure, discloses a hinge member which extends into the concavity of a reverse buckling disk in alignment with the mouth or open side of a C-shaped scoreline. When the disk ruptures in the reverse direction, the petal created by the C-shaped scoreline wraps around the hinge. The hinge thereby prevents fragmentation of the petal.

Although the hinge member has been successful in preventing fragmentation of the reverse buckling disk, the hinge member does not work reliably when placed on the convex side of the disk, as would be needed with a "conventional" rupture disk. Also, rupture disk assemblies are easily installed upside down, as most rupture disks and rupture disk assemblies may be installed with either side of the disk oriented towards the fluid pressure source or vessel which the disk is installed to protect. Since, at present, there is no reliable anti-fragmentation device for use on the convex side of a domed rupture disk, if a reverse buckling disk is installed upside down, the system downstream of the rupture disk is exposed to fragments of the rupture disk. Since installing a hinge member on the convex side of the rupture disk has proven to be an unreliable method of preventing fragmentation, simply placing hinge members on each side of a disk is not an acceptable solution to this problem.

Therefore, there is a need for a device which may be placed on the convex side of a rupture disk to prevent fragmentation when the rupture disk bursts in the conventional direction. There is also a need for apparatus and method for preventing fragmentation of a rupture disk which may be placed on both sides of the rupture disk in order to prevent fragmentation whether the assembly is installed in the proper direction or upside down. There is also a need for such an apparatus which is easily installed and which may be retrofit to rupture disk assemblies in operating facilities.

SUMMARY OF THE INVENTION

The present invention is contemplated to overcome the foregoing deficiencies and meet the above-described needs. In accomplishing this, the present invention provides a novel and improved apparatus and method for preventing fragmentation of a rupture disk during pressure relieving rupture and fluid flow through the disk.

The invention includes rupture control means for causing the disk to rupture into a petal of a preselected shape and size and bending means for bending the petal. The petal has a body, at least two generally opposed edges extending across the rupture disk and across the fluid flow path through the rupture disk, and a base for retaining the petal to the rupture disk. The bending means retards motion of the generally opposed edges as the body of the petal is forced away from the rupture disk by the pressure relieving rupture and fluid flow through the ruptured disk, thereby bending the body of the petal into a channel shape. The invention preferably includes protuberance means for impacting the channel-shaped body of the petal as the petal is forced away from the rupture disk by the pressure relieving rupture. The preferred protuberance means is disposed in general alignment with and spaced away from the base of the petal and converts the kinetic energy of the petal into deformation of the channel-shaped body of the petal in order to prevent severance of the base of the petal from the rupture disk.

The preferred invention includes a housing positionable adjacent the rupture disk. The housing has an inside surface circumscribing at least a portion of the fluid flow path through the rupture disk. The bending means includes a first protrusion extending inwardly from the inside surface of the housing beyond one edge of the petal so that one edge of the petal contacts the first protrusion when the rupture disk ruptures. The bending means also includes a second protrusion extending inwardly from the inside surface of the housing beyond the opposite edge of the petal so that the opposite edge of the petal contacts the second protrusion when the rupture disk ruptures. The protuberance means includes a protuberance extending from the inside surface of a housing and disposed in general alignment with and spaced away from the base of the petal. The protuberance may be a portion of the same housing which provides the first and second protrusions.

It is an advantage of the present invention to provide apparatus and method for preventing fragmentation of a rupture disk which may be used on either or both sides of the rupture disk.

It is an advantage of the present invention to provide apparatus and method for preventing fragmentation of a rupture disk which may be placed on the convex side of a domed, concave-convex rupture disk.

It is an advantage of the present invention to prevent fragmentation of a rupture disk when the rupture disk is installed upside down.

It is an advantage of the present invention to provide an apparatus for preventing fragmentation of a rupture disk which may be retrofitted to rupture disks in operating facilities.

BRIEF DESCRIPTION OF THE DRAWINGS

The present invention will be better understood by reference to the example of the following drawings.

DETAILED DESCRIPTION OF THE PREFERRED EMBODIMENTS

Preferred embodiments of the invention will now be described with reference to the drawings. Like reference characters refer to like or corresponding parts throughout the drawings and description.

FIGS. 1-12 present embodiments of the apparatus and method for preventing fragmentation of a rupture disk, generally designated 20, during pressure relieving rupture of the rupture disk 22 and fluid flow through the ruptured disk. Although a preferred embodiment of the apparatus 20, described herein to facilitate an enabling understanding of the invention, is used in conjunction with a domed, or concave-convex, rupture disk 22, it is intended to be understood that the invention may be adapted to virtually any shape of rupture disk.

Figure 1:
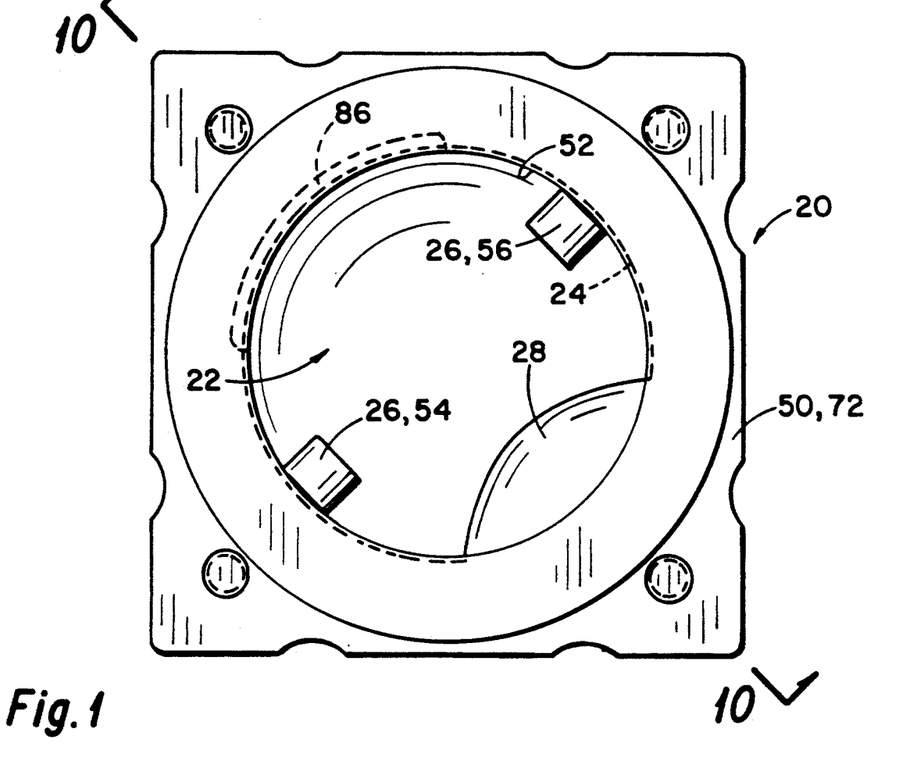
FIG. 1 is a top view of an embodiment of a rupture disk assembly of the present invention.
Figure 2:
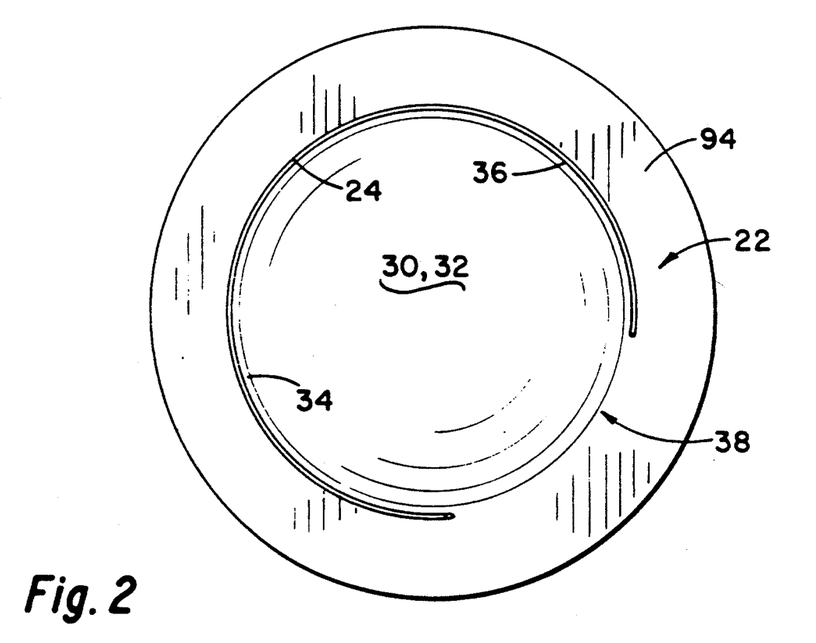
FIG. 2 is a top view of a rupture disk which may be used with the present invention.

Referring to the example of FIG. 1, the apparatus 20 may be generally described as including rupture control means 24, bending means 26, and protuberance means 28. Referring to the example of FIGS. 2 and 3, the rupture control means 24 is provided for rupturing the disk 22 into a petal 30 having a body 32, at least two generally opposed edges 34, 36, and a base 38 for retaining the petal 30 to the rupture disk 22. The preferred rupture control means 24 is a groove or scoreline 24 which creates a line of weakness in the rupture disk 22 along which the rupture disk bursts when exposed to a pressure greater than the design pressure of the disk 22 and scoreline 24. The scoreline 24 is shaped to provide the desired shape of petal 30. In the prototype apparatus 20, and preferred embodiment, the scoreline is a C-shaped scoreline, as exemplified in FIG. 2. It is intended to be understood that the scoreline 24 may take various shapes in conjunction with the design and shape of the bending means 26 and protuberance means 28 to achieve the apparatus and method of the present invention, as would be known to one skilled in the art in view of the disclosure contained herein.

The rupture control means 24 may also take the form of a cutting edge (not illustrated) which is housed on a support member adjacent the rupture disk 22 and which cuts the rupture disk into one or more petals when an overpressure forces the disk 22 against the cutting edge. An example of one such cutting edge is provided in U.S. Pat. No. 4,236,648, assigned to the assignee of the present invention, which is incorporated herein by reference thereto for purpose of disclosure.

Bending means 26 is provided for retarding motion of the generally opposed edges 34, 36 of the petal 30 as the body 32 of the petal is forced away from the ruptured disk by a pressure relieving rupture. By retarding motion of the edges 34, 36, the bending means 26 bends the body 32 of the petal 30 in a channel shape, as exemplified in FIG. 3. In the preferred embodiment, protuberance means 28 is provided for impacting the channel-shaped body 32 of the petal 30 as the petal 30 is forced away from the rupture disk 22 by a pressure relieving rupture and fluid flow through the ruptured disk. The protuberance means 28 serves to convert the kinetic energy of the moving petal into deformation of the channel-shaped body 32 in order to prevent severance of the base 38 of the petal 30 from the rupture disk 22. Referring to the example of FIGS. 3 and 4, it can be seen that the protuberance means 28 both crushes the channel-shaped petal and bends the channel-shaped petal 30 about the protuberance means 28. It is contemplated that this crushing and bending of the channel-shaped petal 30 distributes the forces on the base 38 in the form of tensile forces, rather than twisting or torsional forces, and thereby relieves the stresses at the corners where the base 38 adjoins the rupture disk 22. The base 38 has more resistance to tensile forces and therefore the reduction or elimination of torsional or twisting forces prevents severance of the base 38 from the rupture disk 22.

Referring to the example of FIG. 1, the preferred apparatus includes a housing 50 positionable adjacent the rupture disk 22. The housing has an inside surface 52 which circumscribes at least a portion of the fluid flow path through the rupture disk 22 which is created when the disk 22 is ruptured. The preferred bending means 26 includes a first protrusion 54 extending inwardly from the inside surface 52 beyond the edge 34 of the petal 30; and a second protrusion 56 extending inwardly from the inside surface 52 beyond the opposite edge 36 of the petal 30. The protrusions should extend sufficiently inwardly beyond the edges 34, 36 of the petal 30 that the edges 34, 36 will contact the protrusions 54, 56 when the rupture disk 22 ruptures and the protrusions 54, 56 will retard motion of the edges 34, 36 of the petal 30. The fluid pressure forces which rupture the disk will therefore act upon the central portion of the petal 30 and bend the petal 30 into a channel shape having a channel axis extending from the base 38 with the apex or web of the channel leading and the edges 34, 36 trailing in a generally upstream direction as the body 32 of the petal 30 passes between the protrusions 54, 56. In the prototype apparatus, at the time the channel-shaped petal passes between the protrusions 54, 56, the channel axis will normally lie in a generally diametrical plane of the flow passageway through the rupture disk and housing inside surface 52.

The protrusions 54, 56 may take virtually any shape which will retard motion of the edges 34, 36 of the petal body 32. Referring to the example of FIGS. 1 and 3, the projections 54, 56 may be generally cylindrically-shaped protrusions. Referring to the example of FIG. 5, the protrusions 54, 56 may be shaped so that the interior edges of the protrusions 54, 56 lie generally along chords of a circular passageway 80 through housing 50. Referring to the example of FIG. 6, the protrusions 54, 56 may be inwardly convexed from generally opposite sides of the housing 50. Referring to the example of FIG. 7, the protrusions 54, 56 may simply be angled across generally opposite sides of the flow passageway 80 through the housing 50 and rupture disk 22 in such a manner that they obstruct the passage of the edges 34, 36 of petal body 32. Although the examples of FIGS. 1-7 utilize a C-shaped scoreline 24 forming a single petal 30, they may be adapted to multiple petal configurations, as would be known to one skilled in the art in view of the disclosure contained herein. For example, the scoreline may be designed to create multiple petals 30 having multiple bases 38 and multiple sets of edges 34, 36, such as if the scoreline 24 creates a number of pie-shaped petals, with bending means 26 and protuberance means 28 provided for each petal.

Figure 8:
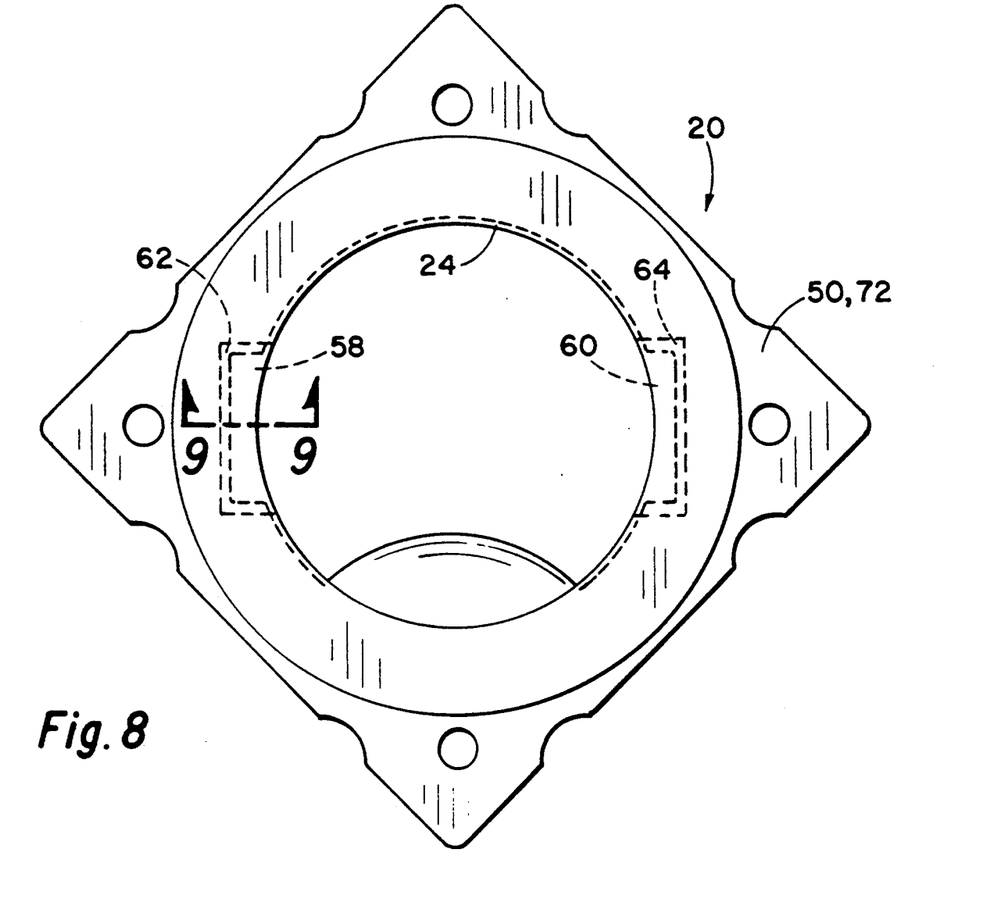
FIG. 8 is a top view of yet another embodiment of a rupture disk assembly of the present invention.
Figure 9:
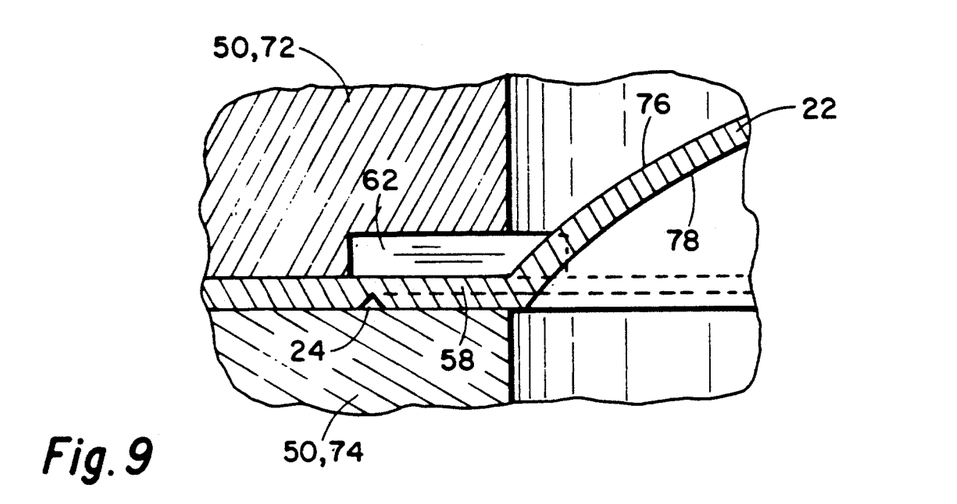
FIG. 9 is a view along line 9—9 of FIG. 8.

FIG. 8 exemplifies another embodiment of the rupture control means 24 and bending means 26 in which the rupture control means is shaped to create ears 58, 60 extending from generally opposed edges of the petal 30. Notches 62, 64 are provided in the housing 50 supporting the rupture disk 22 so that an overpressure on the side of the rupture disk 22 opposite the notches 62, 64 will create a shearing, tearing force (rather than a tensile force) on the scoreline 24 coincident with the notches 62, 64. As an overpressure occurs and the disk 22 ruptures along the scoreline 24, the ears 58, 60 of the petal body 32 will strike the sides of the housing 50 below the notches 62, 64 which will retard the motion of the ears 58, 60 and create the desired channel shape in the petal body 32 previously discussed. The ears 58, 60 may take various shapes which will achieve this function as would be known to one skilled in the art in view of the disclosure contained herein.

Figure 3:
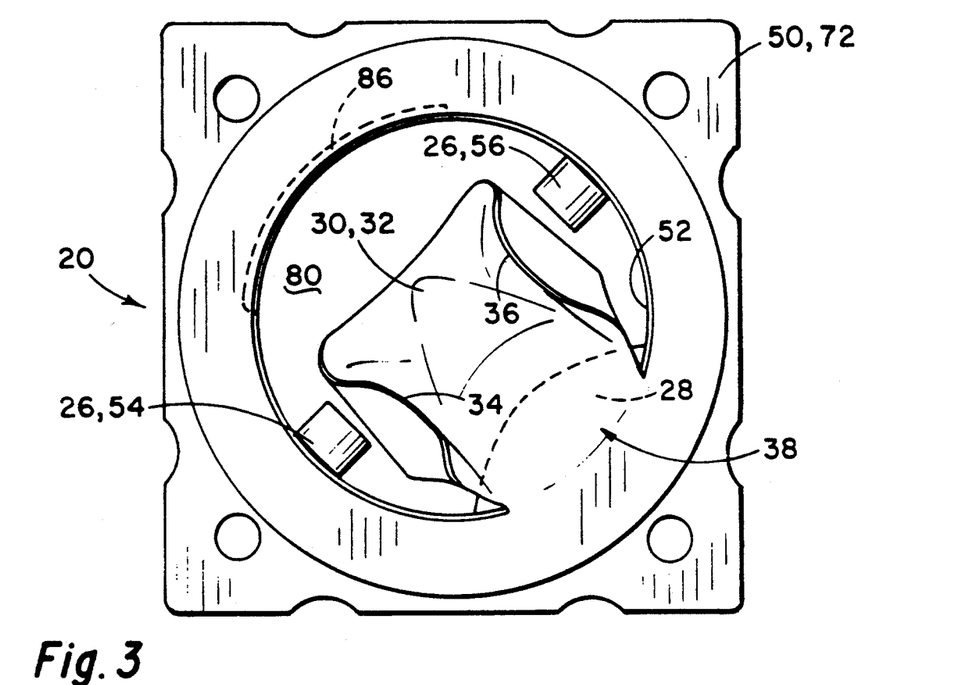
FIG. 3 is a view along line 3—3 of FIG. 4 depicting the rupture disk in a ruptured condition.
Figure 4:
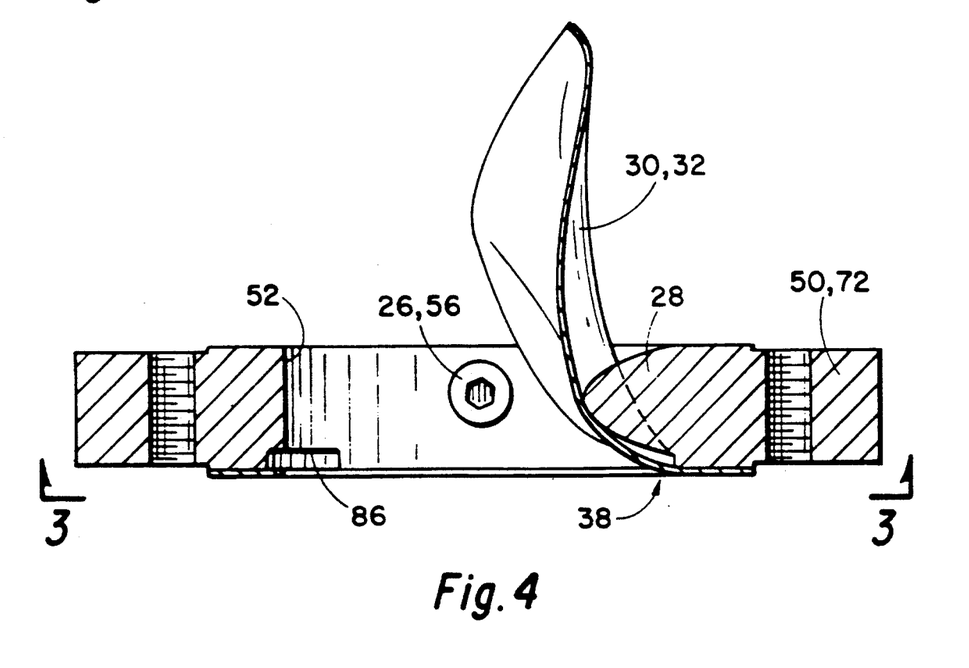
FIG. 4 is a cross-sectional view of the inlet head of the rupture disk assembly depicting the rupture disk in a ruptured condition.
Figures 5, 6, 7:
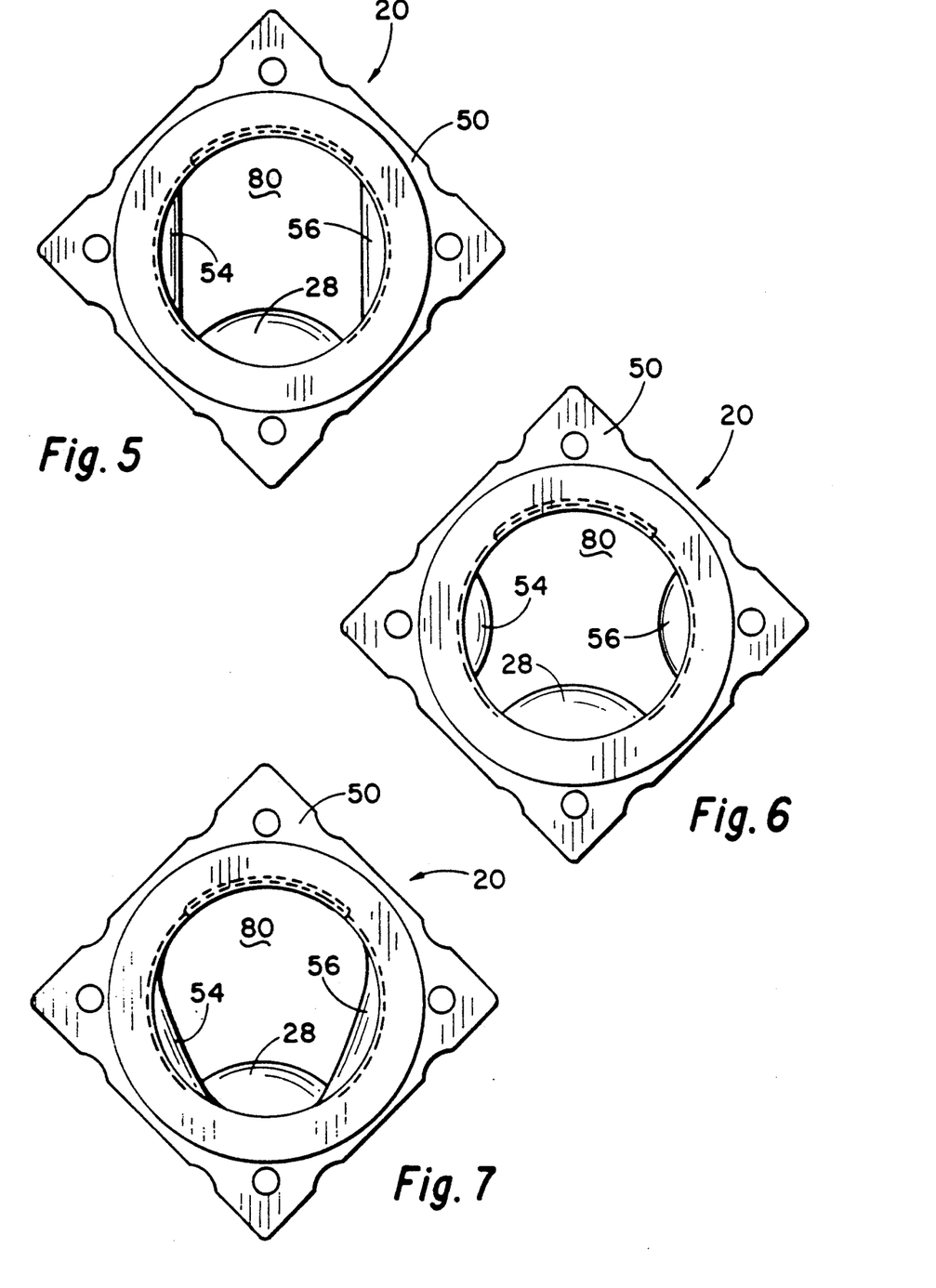
FIG. 5 is a top view of another embodiment of a rupture disk assembly of the present invention.
FIG. 6 is a top view of yet another embodiment of a rupture disk assembly of the present invention.
FIG. 7 is a top view of yet another embodiment of a rupture disk assembly of the present invention.

Referring to the example of FIGS. 3 and 4 in the preferred apparatus 20 the protuberance means 28 is a protuberance, also designated 28, extending from the inside surface 52 of the housing 50 and disposed in general alignment with and spaced away from the base 38 of the petal 30. The protuberance 28 is spaced from the base 38 such that the protuberance 28 will impact the channel-shaped portion of the petal body 32 when the disk 22 ruptures. By "aligned" with the base 38 of the petal 30 is meant that the protuberance 28 is generally placed on the same circumferential side of the flow passageway 80 through the rupture disk 22 and housing 50 as is the base 38. The shape and size of the protuberance 28 is not critical, although it should extend sufficiently into the flow passageway 80 that it deforms the channel-shaped petal body 32 and essentially dissipates the kinetic energy imparted to the petal body 32 by the rupture of the disk 22, causing the channel-shaped petal body 32 to bend around the protuberance 28 before contacting the wall (not illustrated) of the flow passageway on the other side of the protuberance 28 from the base 38. Preferably, the protrusions 54, 56 bend the petal body 32 into a channel shape having an axis extending about diametrically across the petal body 32 from the base 38 (or along an axis of the petal body which approximately bisects the base 38 for petal shapes which are not round). The protuberance 28 should be located so that it impacts at approximately the center of the channel-shaped petal body 32.

Figure 10:
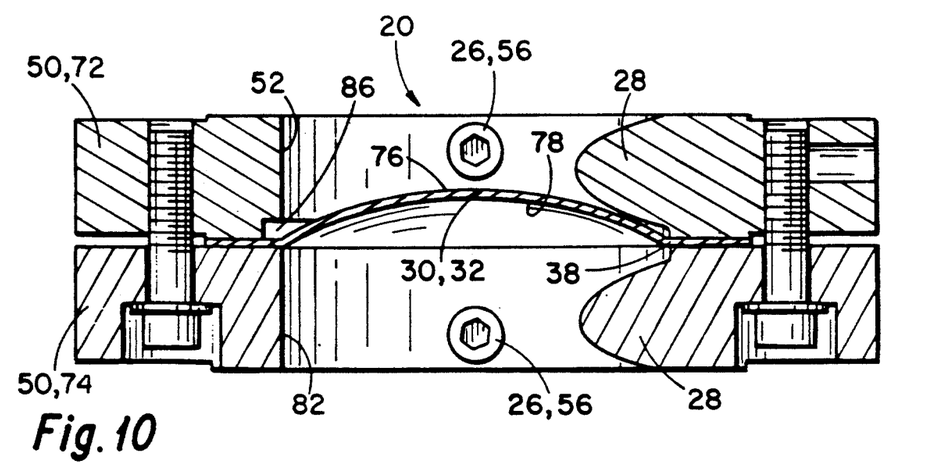
FIG. 10 is a view along line 10—10 of FIG. 1.

The protrusions 54, 56 may be on the same or a separate housing 50 as the protuberance 28. Preferably, the protrusions 54, 56 are on the same housing 50 as is the protuberance means 28, as exemplified in FIGS. 1 and 10. Preferably, the housing 50 is a support member, also designated 50, for supporting the rupture disk 22 and having a fluid flow passageway for conducting pressure relieving fluid flow to and/or from the rupture disk 22. The housing 50 may be adapted for use as an inlet support member 72 or an outlet support member 74, the inlet support member being used to support the inlet side 76 of a rupture disk 22 and the outlet support member 74 being used to support the outlet side 78 of a rupture disk 22. In a reverse buckling rupture disk 22, the inlet side 76 is the convex side, also designated 76, as exemplified in FIG. 10. Referring to the example of FIGS. 1 and 10, the inlet and outlet support members 72, 74 may be a matched set of heads 72, 74 in which the rupture disk 22 may be placed and pretorqued outside of an operating system. The operating system would have companion flanges into which the pretorqued, modularized assembly could be easily inserted and removed, as would be known to one skilled in the art in view of the disclosure contained herein. In the prototype apparatus 20, the rupture control means 24 is a C-shaped scoreline, as previously mentioned, and the first and second protrusions 54, 56 and protuberance 28 are connected to the cylindrical wall 52 of the flow passageway of the inlet support member 72. FIG. 10 also exemplifies the inclusion of the protrusions 54, 56 and protuberance 28 on the cylindrical wall 82 of the flow passageway of the outlet support member 74. As previously mentioned, the invention may be used on both sides of a rupture disk in order to provide anti-fragmentation protection if the rupture disk assembly is installed upside down and also to provide anti-fragmentation protection in the event an overpressure should occur on the outlet side of the rupture disk, thereby preventing fragmentation of the rupture disk 22 into the normally upstream equipment.

Notch 86 is provided in the inlet support member on the diametrically opposite side of the inlet support member 72 and rupture disk 22 from the base of the petal 38 and protuberance 28 in order to reduce the likelihood of overpressure if the rupture disk assembly is installed upside down. The notch 86 concentrates stresses on the scoreline adjacent the notch 86 when excessive pressure is exerted on the concave, outlet side 78 of the rupture disk 22. The operation of the notch is fully explained in U.S. Pat. No. 5,005,722, assigned to the assignee of the present invention, which is incorporated herein by reference thereto for purposes of disclosure. The operation of a reverse buckling rupture disk is fully discussed in U.S. Pat. No. 5,167,337, also owned by the assignee of the present invention, which is also incorporated by reference for purposes of disclosure.

Figure 11:
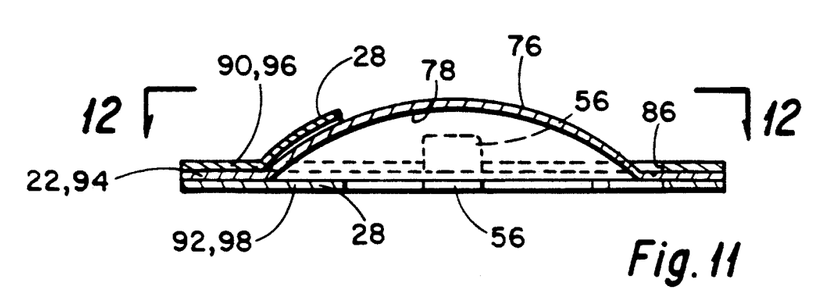
FIG. 11 is a cross-sectional view of another embodiment of a rupture disk assembly of the present invention.
Figure 12:
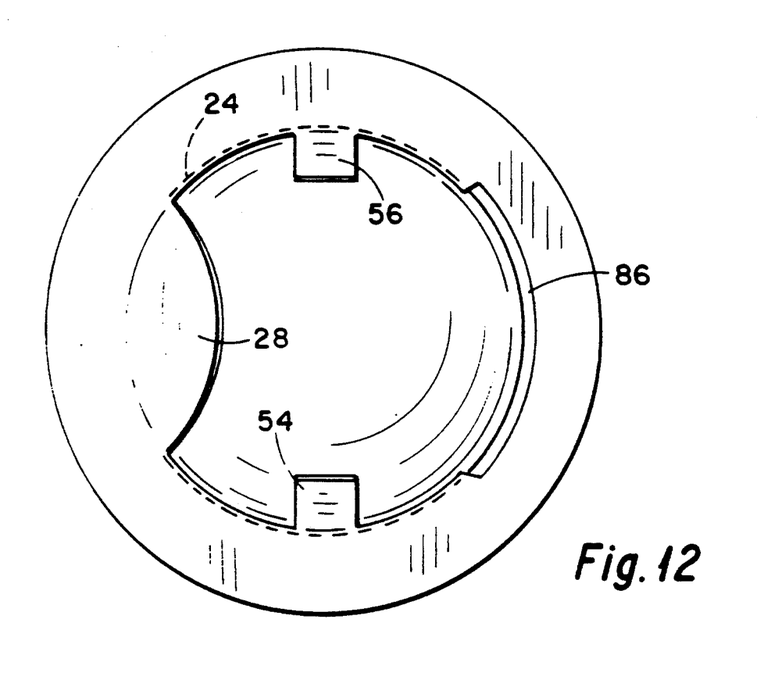
FIG. 12 is a top view of FIG. 11.

Referring to the example of FIGS. 11 and 12, the protrusions 54, 56 and protuberance 28 may also be provided on annular inlet ring 90 and outlet ring 92. The inlet and outlet rings 90, 92 should be matched to the rupture disk 22, i.e., so that the flanges 96, 98 of the rings 90, 92 fit properly with the flange 94 of the rupture disk 22 and within the inlet and outlet support members 72, 74. By placing the protrusions 54, 56 and protuberance 28 on rings 90, 92, the invention may be retrofit to rupture disk assemblies installed in operating systems. Either or both of the inlet and outlet rings 90, 92 may be used with a rupture disk 22. On the outlet ring 92, the protuberance 28 and protrusions 54, 56 may be planar with the flange 98 of the outlet ring 92 or may extend into the concavity of a domed rupture disk 22 (not illustrated) in such a manner that they do not contact the outlet side 78 of the rupture disk 22 prior to rupture. In all embodiments of the invention, on both the inlet and outlet sides 76, 78 of the rupture disk 22, the protuberance 28 and protrusions 54, 56 should not contact the rupture disk 22 prior to rupture, as such contact may interfere with operation of the rupture disk 22. In all embodiments, the protuberance 28 and protrusions 54, 56 may be integral with or separate components from the support members 72, 74 and rings 90, 92.

Referring to the examples of FIGS. 1-4, the method for preventing fragmentation of a rupture disk 22 during pressure relieving rupture and fluid flow through the ruptured disk 22 includes rupturing the disk 22 into a petal 30 having a body 32, at least two generally opposed edges 34, 36 extending across the rupture disk 22, and a base 38 for retaining the petal 30 to the rupture disk 22; retarding motion of the generally opposed edges 34, 36 as the body 32 of the petal 30 is forced away from the rupture disk 22 by the pressure relieving rupture in order to bend the body of the petal 30 into a channel shape; and deforming the channel-shaped body 32 of the petal 30 as the petal is forced away from the rupture disk 22 by the forces of the pressure relieving rupture. The kinetic energy imparted to the petal 30 by the pressure relieving rupture is converted into deformation of the channel-shaped body 32 in order to prevent severance of the base 38 of the petal 30 from the rupture disk 22. The method provides for circumscribing at least a portion of a fluid flow path through the rupture disk 22 with an inside surface 52 of a housing 50. Motion of the opposed edges 34, 36 of the petal 30 is retarded by extending a first protrusion 54 inwardly from the inside surface 52 beyond one edge 34 of the petal 30 so that the edge 34 of the petal 30 contacts the first protrusion 54 when the rupture disk 22 ruptures; and by extending a second protrusion 56 inwardly from the inside surface 52 beyond the opposite edge 36 of the petal 30 so that the opposite edge 36 of the petal 30 contacts the second protrusion 56 when the rupture disk 22 ruptures. The method also provides for extending a protuberance 28 from the inside surface 52 of the housing 50 in generally alignment with and spaced away from the base 38 of the petal 30 in order to deform the channel-shaped body 32 of the petal 30 as the petal 30 is forced away from the rupture disk 22 by a pressure relieving rupture.

The method further provides for using the housing 50 as a support member, also designated 50, for supporting the rupture disk. The support member 50 has a fluid passageway for conducting pressure relieving fluid flow to and from the rupture disk 22. The method further provides for placing the support member 50 on the inlet side 76 of the rupture disk 22 in order to provide an inlet support member 72; and for placing the support member 50 on the outlet side 78 of the rupture disk 22 in order to provide an outlet support member 74.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for preventing fragmentation of a rupture disk during pressure relieving rupture and fluid flow through the ruptured disk, comprising:
   rupture control means for causing the disk to rupture into a petal of a preselected shape and size; the petal having a body, at least two generally opposed edges extending across a fluid flow path through the rupture disk, and a base for retaining the petal to the rupture disk; and
   bending means for retarding motion of the generally opposed edges as the body of the petal is forced away from the rupture disk by fluid flow through the ruptured disk, thereby bending the body of the petal into a channel shape.

2. Apparatus of claim 1, comprising:
   protuberance means disposed in general alignment with and spaced away from the base of the petal for impacting the channel-shaped body of the petal as the petal is forced by fluid flow and converting the kinetic energy of the petal into deformation of the channel-shaped body of the petal.

3. Apparatus of claim 1, comprising:
   a housing positionable adjacent the rupture disk having an inside surface circumscribing at least a portion of the fluid flow path through the rupture disk; and in which the bending means comprises:
   a first protrusion extending inwardly from the inside surface beyond one edge of the petal so that the edge of the petal contacts the first protrusion when the rupture disk ruptures; and
   a second protrusion extending inwardly from the inside surface beyond the opposite edge of the petal so that the opposite edge of the petal contacts the second protrusion when the rupture disk ruptures.

4. Apparatus for preventing fragmentation of a rupture disk during pressure relieving rupture and fluid flow through the ruptured disk, comprising:
   rupture control means for rupturing the disk into a petal having a body, at least two generally opposed edges extending across the rupture disk, and a base for retaining the petal to the rupture disk;
   bending means for retarding motion of the generally opposed edges as the body of the petal is forced away from the ruptured disk by pressure relieving rupture, thereby bending the body of the petal into a channel shape; and
   protuberance means for impacting the channel-shaped body of the petal as the petal is forced away from the rupture disk by pressure relieving rupture.

5. Apparatus of claim 4:
wherein the protuberance means is further defined as converting the kinetic energy of the petal into deformation of the channel-shaped body in order to prevent severance of the base of the petal from the rupture disk.

6. Apparatus of claim 4, comprising:
a housing positionable adjacent the rupture disk having an inside surface circumscribing at least a portion of a fluid flow path through the rupture disk; and
in which the bending means comprises:
  a first protrusion extending inwardly from the inside surface beyond one edge of the petal so that the edge of the petal contacts the first protrusion when the rupture disk ruptures; and
  a second protrusion extending inwardly from the inside surface beyond the opposite edge of the petal so that the opposite edge of the petal contacts the second protrusion when the rupture disk ruptures.

7. Apparatus of claim 4, comprising:
a housing positionable adjacent the rupture disk having an inside surface circumscribing at least a portion of a fluid flow path through the rupture disk; and
in which the protuberance means comprises:
  a protuberance extending from the inside surface of the housing and disposed in general alignment with and spaced away from the base of the petal.

8. Apparatus of claim 7 in which the housing comprises:
  a support member for supporting the rupture disk and having a fluid flow passageway for conducting fluid flow and pressure relief.

9. Apparatus of claim 8 in which the rupture disk has an inlet side and an outlet side and in which the housing comprises:
  an inlet support member.

10. Apparatus of claim 8 in which the rupture disk has an inlet side and an outlet side and in which the housing comprises:
  an outlet support member.

11. Method for preventing fragmentation of a rupture disk during pressure relieving rupture and fluid flow through the ruptured disk, comprising:
  rupturing the disk into a petal having a body, at least two generally opposed edges extending across the rupture disk, and a base for retaining the petal to the rupture disk;
  retarding motion of the generally opposed edges as the body of the petal is forced away from the rupture disk by the pressure relieving rupture, thereby bending the body of the petal into a channel shape; and
  deforming the channel-shaped body of the petal as the petal is forced away from the rupture disk by the pressure relieving rupture.

12. Method of claim 11 in which the deforming step comprises:
  converting the kinetic energy of the petal into deformation of the channel-shaped body in order to prevent severance of the base of the petal from the rupture disk.

13. Method of claim 11, comprising:
  circumscribing at least a portion of a fluid flow path through the rupture disk with an inside surface of a housing; and
  in which the retarding step comprises:
    extending a first protrusion inwardly from the inside surface beyond one edge of the petal so that the edge of the petal contacts the first protrusion when the rupture disk ruptures; and
    extending a second protrusion inwardly from the inside surface beyond the opposite edge of the petal so that the opposite edge of the petal contacts the second protrusion when the rupture disk ruptures.

14. Method of claim 11, comprising:
  circumscribing at least a portion of a fluid flow path through the rupture disk with an inside surface of a housing; and
  in which the deforming step comprises:
    extending a protuberance from the inside surface of the housing in general alignment with and spaced away from the base of the petal.

15. Method of claim 13 in which the circumscribing step comprises:
  supporting the rupture disk with a support member having a fluid passageway for conducting fluid flow through the rupture disk.

16. Method of claim 15 in which the rupture disk is defined as having an inlet side and an outlet side and in which the supporting step comprises:
  placing the support member on the inlet side of the rupture disk.

17. Method of claim 15 in which the rupture disk is defined as having an inlet side and an outlet side and in which the supporting step comprises:
  placing the support member on the outlet side of the rupture disk.

* * * * *